(12) United States Patent  (10) Patent No.: US 8,505,211 B2
Chang  (45) Date of Patent: Aug. 13, 2013

(54) MEASURING DEVICE FOR DETERMINING A THREAD LENGTH OF A FASTENER

(75) Inventor: Peter J. H. Chang, Taipei (TW)

(73) Assignees: Gourmet Equipment (Taiwan) Corporation, Taipei (TW); Gorilla Automotive Products, Los Angeles, CA (US)

( * ) Notice: Subject to any disclaimer, the term of this patent is extended or adjusted under 35 U.S.C. 154(b) by 236 days.

(21) Appl. No.: 13/209,236

(22) Filed: Aug. 12, 2011

(65) Prior Publication Data

US 2012/0210591 A1 Aug. 23, 2012

Related U.S. Application Data

(63) Continuation-in-part of application No. 13/115,769, filed on May 25, 2011.

(30) Foreign Application Priority Data

Feb. 21, 2011 (TW) .............................. 100203092 A

(51) Int. Cl.
 *G01B 5/18* (2006.01)
(52) U.S. Cl.
 USPC ................................. 33/836; 33/542; 33/833

(58) Field of Classification Search
 USPC .................... 33/203, 483, 542, 832, 833, 836
 See application file for complete search history.

(56) References Cited

U.S. PATENT DOCUMENTS

| 3,016,619 | A | * | 1/1962 | Mueller | 33/836 |
| 3,269,019 | A | * | 8/1966 | Krohn | 33/836 |
| 3,352,018 | A | * | 11/1967 | Mazeika | 33/836 |
| 4,760,847 | A | * | 8/1988 | Vaillancourt | 33/833 |
| 6,427,351 | B1 | * | 8/2002 | Matthews et al. | 33/542 |
| 2009/0320310 | A1 | * | 12/2009 | Pelotte | 33/836 |
| 2010/0137874 | A1 | * | 6/2010 | Kim et al. | 33/836 |
| 2012/0090188 | A1 | * | 4/2012 | Chang | 33/833 |

* cited by examiner

*Primary Examiner* — G. Bradley Bennett
(74) *Attorney, Agent, or Firm* — Christie, Parker & Hale, LLP

(57) ABSTRACT

A measuring device is adapted for determining a safety thread length LS of a fastener required for fastening a wheel onto a wheel hub unit. The measuring device includes an elongated measuring rod, a positioning member secured to a front end of the measuring rod and configured to abut against a circumferential abutment seat of the wheel, and a plurality of modular sleeves, each configured to be sleevably positioned on and matched up with the measuring rod. Subsequent to bringing the positioning member to abut against the circumferential abutment seat, the modular sleeve is dragged forwardly until a front sleeve end reaches an inner major surface of the wheel, and LS is determined to be equal to the distance between the front end and a rear sleeve end of the modular sleeve.

6 Claims, 7 Drawing Sheets

MEASURING DEVICE FOR DETERMINING A THREAD LENGTH OF A FASTENER

CROSS-REFERENCE TO RELATED APPLICATION

This application claims priority of Taiwanese Utility Model Application No. 100203092, filed on Feb. 21, 2011, the disclosure of which is herein incorporated by reference.

This application is a continuation-in-part of U.S. patent application Ser. No. 13/115,769, filed by the applicant on May 25, 2011, the entire disclosure of which is incorporated herein by reference.

BACKGROUND OF THE INVENTION

1. Field of the Invention

This invention relates to a measuring device, more particularly to a measuring device adapted for determining a safety thread length of a fastener required for fastening a wheel onto a wheel hub unit.

2. Description of the Related Art

In co-pending U.S. patent application Ser. No. 13/115,769, the applicant discloses a measuring device that includes a graduated measuring rod, a positioning member secured to a front end of the measuring rod to mate with an abutment seat of a bolt hole in a wheel for measuring a length of the bolt hole using graduations on the measuring rod, and an anchor member secured to a rear end of the measuring rod to be brought into abutment with a flange surface of a wheel hub unit for measuring a thread length of a threaded bolt or bore.

It is desirable to improve the aforesaid measuring device to simplify the measuring process.

SUMMARY OF THE INVENTION

An object of the present invention is to provide a measuring device which can be easily processed to rapidly determine the thread length of a fastener required for fastening a wheel onto a wheel hub unit.

According to this invention, the measuring device includes an elongated measuring rod, a positioning member, and a plurality of modular sleeves. The elongated measuring rod extends straight in a longitudinal direction to terminate at front and rear ends, and has a first segment measured from the front end and set equal in length to a first axial length L1 of a bolt hole in a wheel, and a second segment extending from the first segment. The positioning member is secured to the front end and is configured to mate with the circumferential abutment seat such that, once the positioning member is brought to abut against the circumferential abutment seat, the second segment is rendered to be measured from an inner major surface of the wheel. Each of the modular sleeves has a second axial length L2, and is configured to be sleevably positioned on and matched up with the second segment such that the safety thread length LS is determined by an equation: $LS \geq L1+L2$.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
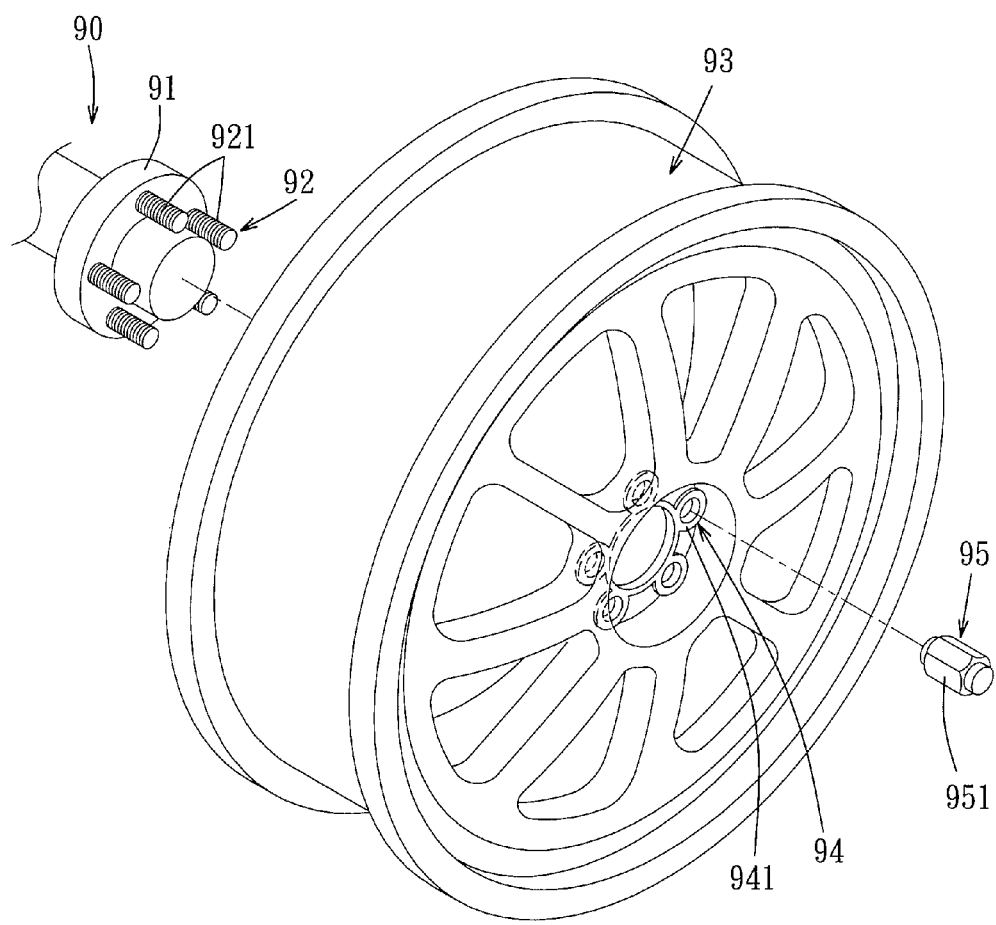
FIG. 1 is a perspective view of a wheel and a wheel hub unit.
Figure 2:
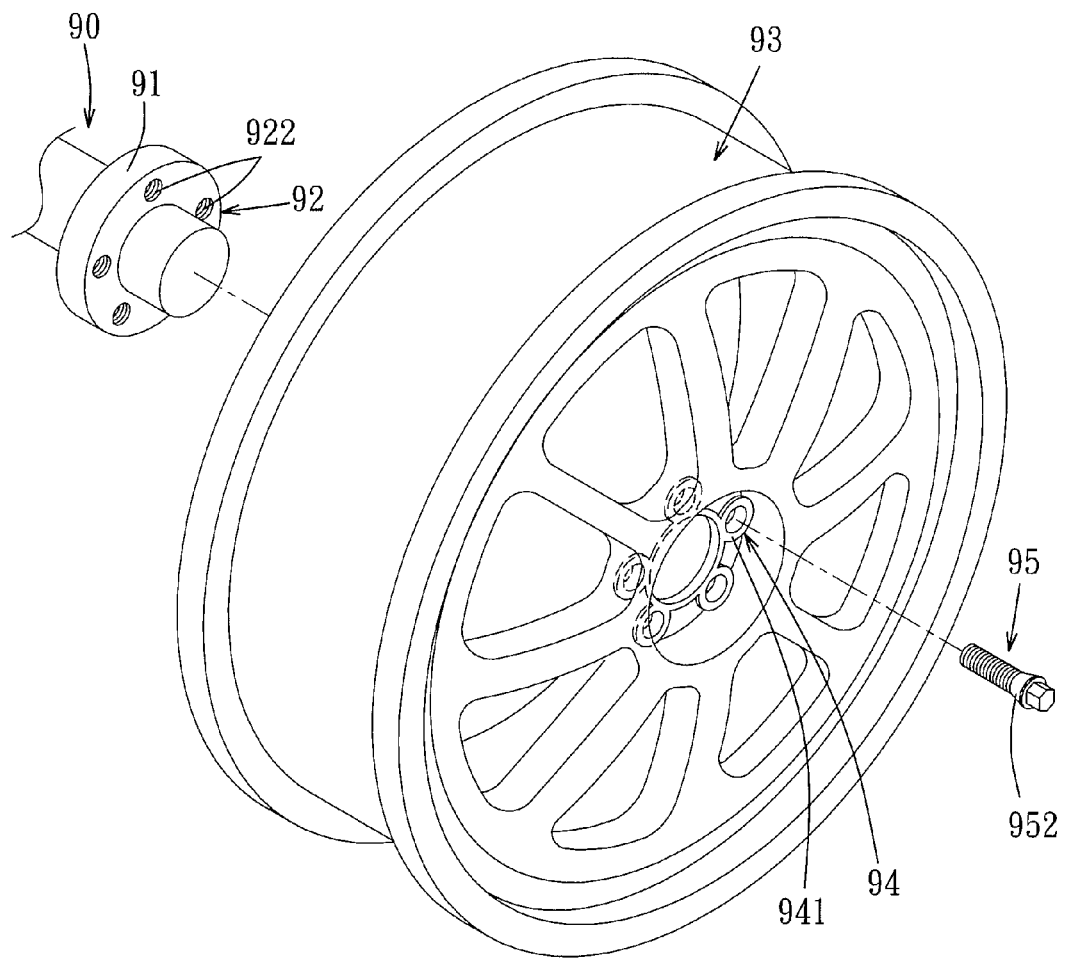
FIG. 2 is a perspective view of another wheel and another wheel hub unit.
Figure 3:
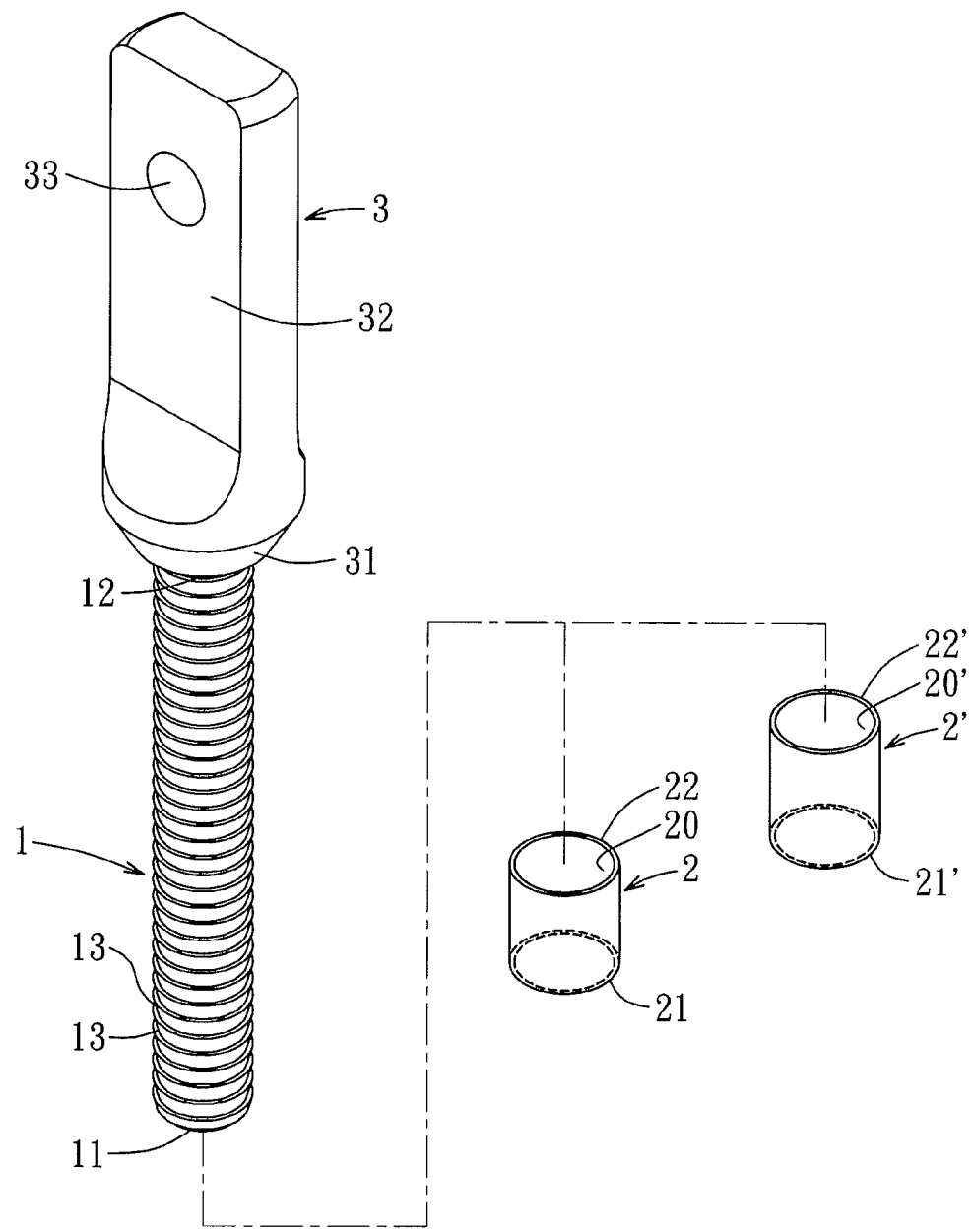
FIG. 3 is a perspective view of the preferred embodiment of a measuring device according to this invention.
Figure 4:
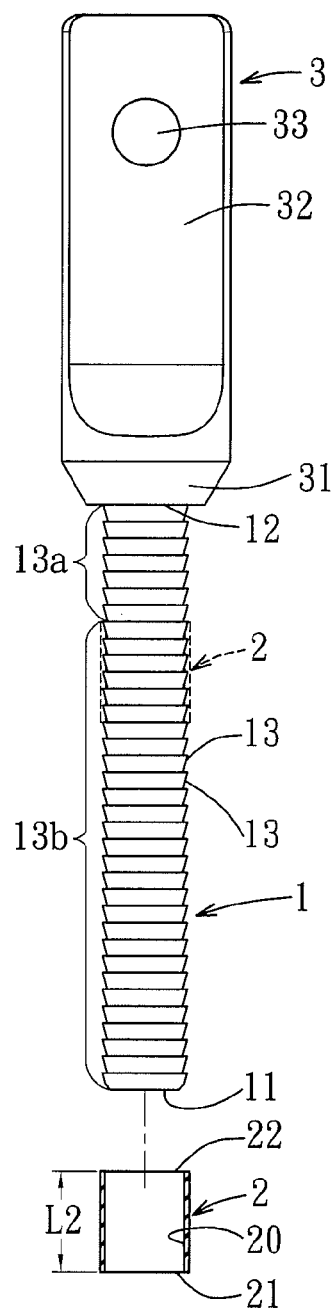
FIG. 4 is a side view of an elongated measuring rod and a modular sleeve of the preferred embodiment.
Figure 5:
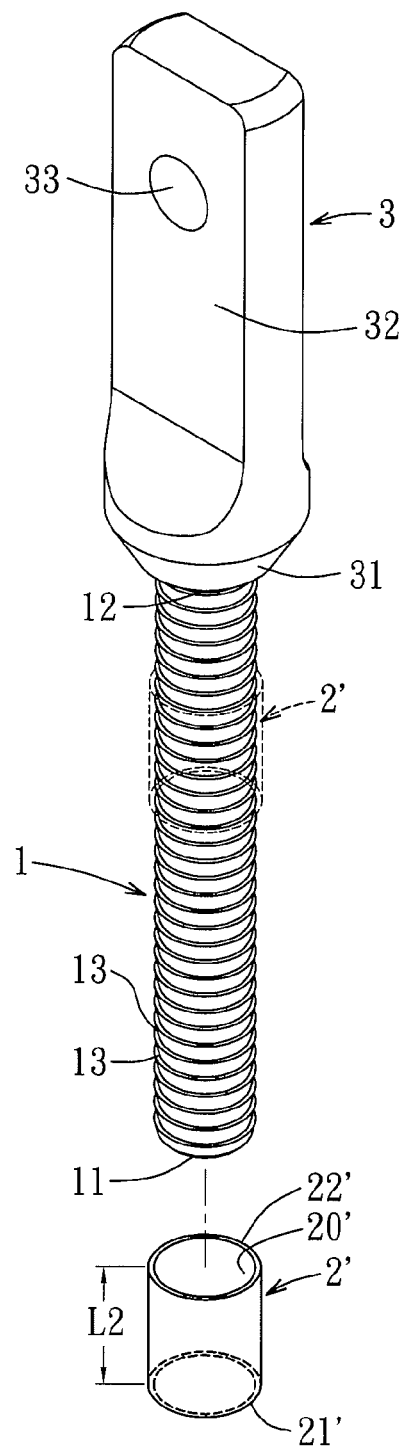
FIG. 5 is a perspective view of the elongated measuring rod and another modular sleeve of the preferred embodiment.
Figure 6:
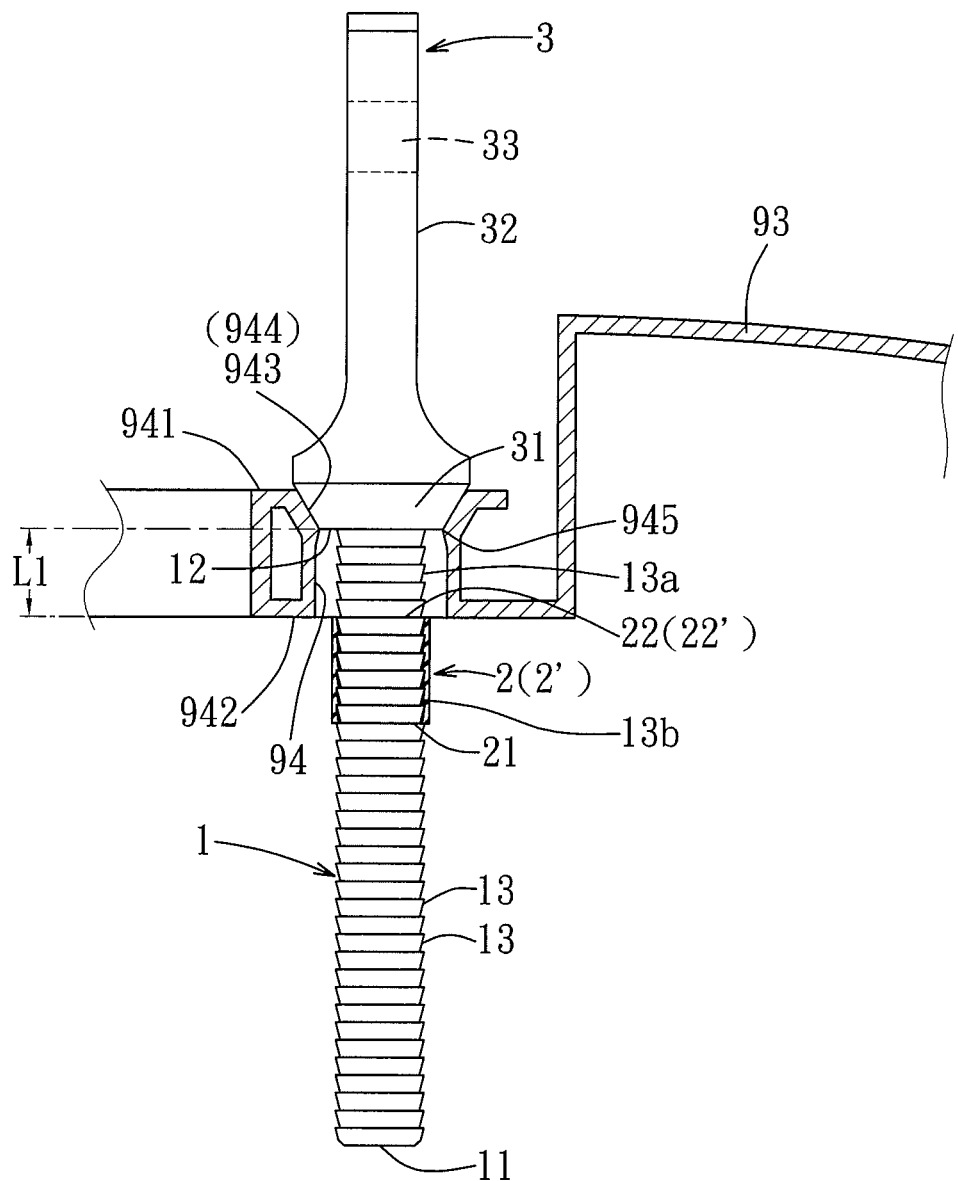
FIG. 6 is a sectional view showing the measuring device of the preferred embodiment used to measure a bolt hole in a wheel.

Referring to FIGS. 1 and 2, a wheel hub unit 90 for a vehicle generally has a hub flange 91 formed with a thread structure 92, and a wheel 93 has a plurality of bolt holes 94 extending through outer and outer major surfaces 941, 942 (see FIG. 6) thereof such that a plurality of lug fasteners 95 (only one is shown) extend through the bolt holes 94 for threaded engagement with the thread structure 92 so as to fasten the wheel 93 onto the wheel hub unit 90. as shown in FIG. 6, the outer major surface 941 of the wheel 93 has an enlarged hole 943 larger in diameter than the respective bolt hole 94 so as to define a circumferential abutment seat 944 which extends toward the inner major surface 942 to terminate at an inner seat end 945 that is distant from the inner major surface 942 by a first axial length (L1). In FIG. 1, one common type of the thread structure 92 includes a plurality of threaded bolts 921 which extend through the bolt holes 94 to be threadedly engaged with the lug fasteners 95 that are in the form of lug nuts 951. In FIG. 2, the other common type of the thread structure 92 includes a plurality of threaded bores 922 such that the lug fasteners 95 in the form of lug bolts 952 extend through the bolt holes 94 for threaded engagement with the threaded bores 922. In the event of wheel replacement, it is required to determine a safety threaded length (LS) of a fastener that includes the lug fastener 95 and the thread structure 92 in accordance with each of the bolt holes 94 in the wheel 93 so as to ensure a secured engagement of the lug nuts 951 (or the lug bolts 952) with the threaded bolts 921 (or the threaded bores 922).

Referring to FIGS. 3 to 6, the preferred embodiment of a measuring device according to the present invention is shown to comprise an elongated measuring rod 1, a positioning member 3, and a plurality of modular sleeves 2, 2'.

The elongated measuring rod 1 extends straight in a longitudinal direction to terminate at front and rear ends 12, 11, and has a first segment (13a) measured from the front end 12 and set equal in length to the first axial length (L1), and a second segment (13b) extending from the first segment (13a). the first and second segments (13a, 13b) have a plurality of annular male serrations 13 displaced from each other in the longitudinal direction. Each of the serrations 13 is of a frusto-conical shape.

The positioning member 3 is secured to the front end 12 and has a frusto-conical mating portion 31 configured to mate with the circumferential abutment seat 944 such that, once the mating portion 31 is brought to abut against the circumferential abutment seat 944, the second segment (13b) is rendered to be measured from the inner major surface 942. Additionally, the positioning member 3 has a handgrip 32 extending away from the front end 12, and having a hole 33 for hanging up the measuring device.

The modular sleeves 2, 2' have different second axial lengths (L2) which correspond to standardized measurements of wheels. For example, to be used with a 14 mm wheel, the safety threaded length (LS) is determined to be not less than the sum of 14 mm (or 14 mm×a value of a safety coefficient) and the first axial length (L1) of the bolt hole 94 of the 14 mm wheel. Each of the modular sleeves 2, 2' is configured to be sleevably positioned on and matched up with the second segment (13b). Specifically, each of the modular sleeves 2, 2' extends to terminate at front and rear sleeve ends 22, 21; 22', 21' which are distant from each other by the second axial length (L2), and has an inner sleeve surface 20, 20' which is configured to be in frictional engagement with and slidable relative to the annular male serrations 13 by a frictional force so as to be slidably retained on the second segment (13b). Thus, subsequent to bringing the positioning member 3 to abut against the circumferential abutment seat 944, the modular sleeve 2, 2' is dragged by a manual force against the frictional force to advance toward the first segment (13a) until the front sleeve end 22, 22' reaches the inner major surface 942 of the wheel 93 where, as a result of matching up of the modular sleeve 2, 2' with the second segment (13b), the safety thread length (LS) is determined at the rear sleeve end 21., i.e., LS≧L1+L2. Preferably, each of the modular sleeves 2, 2' is made from an elastomeric material. More preferably, as shown in FIG. 9, the inner sleeve surface 20, 20' of each of the modular sleeves 2, 2' may have a plurality of annular female serrations 23, 23' which are configured to mate with the annular male serrations to increase the frictional force generated therebetween.

Figure 7:
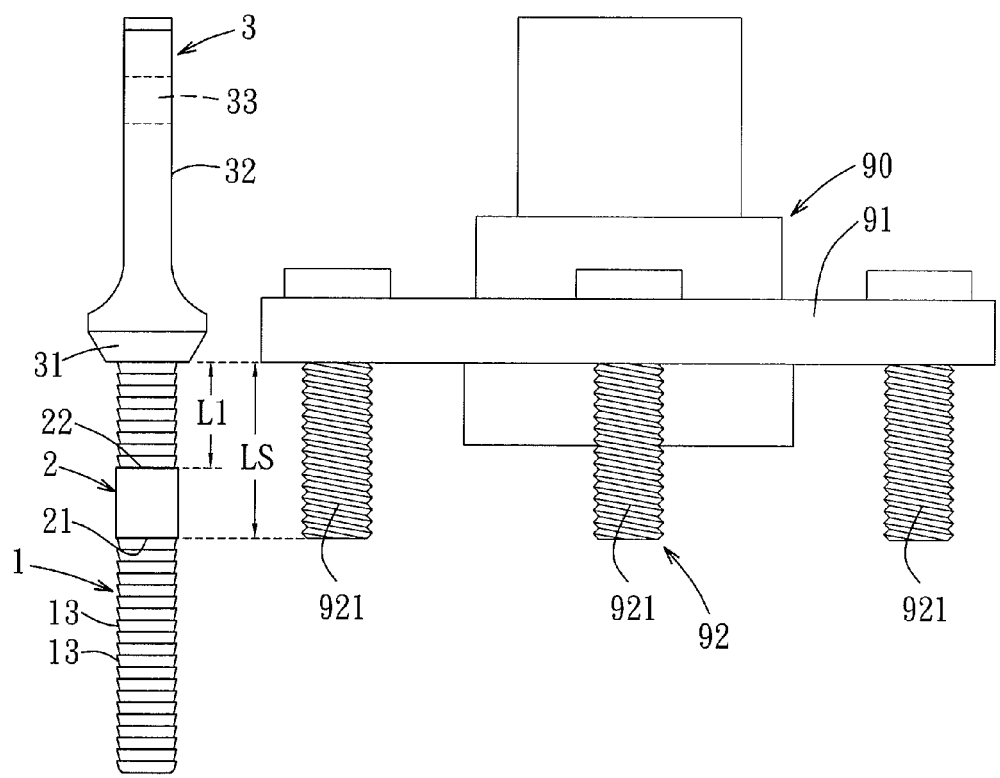
FIG. 7 is a side view showing the measuring device of the preferred embodiment used to measure a threaded bolt.

Referring to FIGS. 6 and 7, to be used with a wheel hub unit 90 shown in FIG. 1, the positioning member 3 is brought to abut against the circumferential abutment seat 944 of a wheel 93. Subsequently, the modular sleeve 2 is sleeved on the second segment (13b) from the rear end 11, and is dragged forcedly toward the first segment (13a) until the front sleeve end 22 reaches the inner major surface 942 of the wheel 94, whereby the safety thread length (LS) is determined to be the distance between the rear sleeve end 21 and the front end 12. Next, as shown in FIG. 7, the measuring device in this state is brought to measure the threaded bolt 921 so as to make sure that the threaded length of the threaded bolt 921 that extends from the hub flange 91 is not less than the safety thread length (LS). Finally, a proper lug nut 951 can be determined by a thread depth which is equal to the difference between the threaded length of the threaded bolt 921 and the first axial length (L1).

Figures 8, 9:
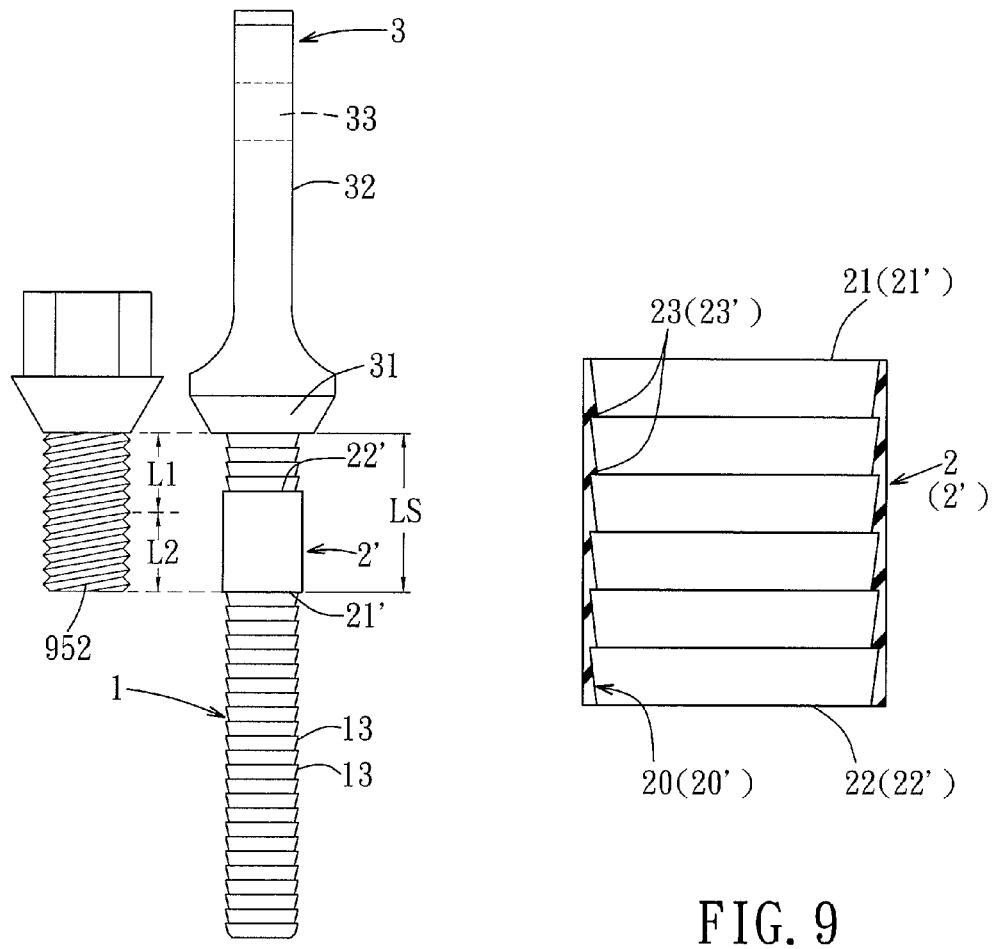
FIG. 8 is a side view showing the measuring device of the preferred embodiment used to measure a lug bolt.
FIG. 9 is a sectional view of the modular sleeve of the preferred embodiment.

Referring to FIGS. 6 and 8, to be used with a wheel hub unit 90 shown in FIG. 2, the modular sleeve 2' is sleeved on the second segment (13b) subsequent to bringing the positioning member 3 to abut against the circumferential abutment seat 944 to measure the safety thread length (LS) that is required for the lug bolt 952 and that is the sum of the first axial length (L1) and the second axial length (L2).

As illustrated, by virtue of provision of the modular sleeves 2, 2' of different axial lengths (L2), safety thread lengths (LS) required for the bolt holes 94 in a variety of wheels 93 can be determined easily and conveniently so as to ensure a secured engagement of the lug nuts 951 (or the lug bolts 952) with the threaded bolts 921 (or the threaded bores 922) for firmly fastening a wheel 93 onto a wheel hub unit 90.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A measuring device adapted for determining a safety thread length LS of a fastener required for fastening a wheel onto a wheel hub unit, the wheel being formed with a bolt hole which extends through inner and outer major surfaces thereof, the outer major surface having an enlarged hole larger in diameter than the bolt hole so as to define a circumferential abutment seat which extends toward the inner major surface to terminate at an inner seat end that is distant from the inner major surface by a first axial length L1, said measuring device comprising:
   an elongated measuring rod which extends straight in a longitudinal direction to terminate at front and rear ends, and which has a first segment measured from said front end and set equal in length to the first axial length, and a second segment that extends from said first segment;
   a positioning member secured to said front end and configured to mate with the circumferential abutment seat such that, once said positioning member is brought to abut against the circumferential abutment seat, said second segment is rendered to be measured from the inner major surface; and
   a plurality of modular sleeves, each having a second axial length L2, and each configured to be sleevably positioned on and matched up with said second segment such that the safety thread length LS is determined by an equation: LS≧L1+L2.

2. The measuring device according to claim 1, wherein each of said modular sleeves extends to terminate at front and rear sleeve ends which are distant from each other by the second axial length, and has an inner sleeve surface which is configured to be in frictional engagement with and slidable relative to said second segment by a frictional force such that, subsequent to bringing said positioning member to abut against the circumferential abutment seat, a respective one of said modular sleeves is dragged by a manual force against the frictional force to advance toward said first segment until said front sleeve end reaches the inner major surface of the wheel where, as a result of matching up of the respective one of said modular sleeves with said second segment, LS is determined at said rear sleeve end.

3. The measuring device according to claim 2, wherein said second segment has a plurality of annular male serrations displaced from each other in the longitudinal direction so as to generate the frictional force to slidably retain the respective one of said modular sleeves on said second segment.

4. The measuring device according to claim 3, wherein each of said modular sleeves is made from an elastomeric material.

5. The measuring device according to claim 3, wherein said inner sleeve surface of each of said modular sleeves has a plurality of annular female serrations which are configured to mate with said annular male serrations of said second segment.

6. The measuring device according to claim 1, wherein said positioning member has a handgrip extending away from said front end.

* * * * *